United States Patent
Brown et al.

(10) Patent No.: US 7,281,015 B2
(45) Date of Patent: Oct. 9, 2007

(54) METHOD AND APPARATUS FOR PROVIDING AN INTERFACE BETWEEN SYSTEM ARCHITECT AND OPNET

(75) Inventors: Bruce J. Brown, Falls Church, VA (US); Glenn Antonacopoulos, Arlington, VA (US); Edwin H. Jacox, Arlington, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 469 days.

(21) Appl. No.: 10/867,721

(22) Filed: Jun. 16, 2004

(65) Prior Publication Data

US 2006/0004790 A1    Jan. 5, 2006

(51) Int. Cl.
G06F 7/00 (2006.01)

(52) U.S. Cl. .................................. 707/101; 707/100

(58) Field of Classification Search ................ 707/100, 707/101
See application file for complete search history.

(56) References Cited

U.S. PATENT DOCUMENTS 6,408,311 B1 * 6/2002 Baisley et al. .............. 707/203

2003/0069908 A1 * 4/2003 Anthony et al. ............ 707/513

OTHER PUBLICATIONS

Dinsmore, John, http://www.opnet.com/news/press/mil3_us_airforce.htm, Feb. 7, 2000.*
Hain, Mary, http://www.government.popkin.com/news/04_27_04.htm, Apr. 27, 2004.*

* cited by examiner

*Primary Examiner*—Tim Vo
*Assistant Examiner*—Aaron Sanders
(74) *Attorney, Agent, or Firm*—Andrews Kurth LLP (57) ABSTRACT

A method and corresponding apparatus provide an interface between two software products, i.e., data structures, to produce an effective enterprise architecture (EA) tool set. The software products may be, for example, System Architect® (SA) software product and Network Modeling and Simulation software product, referred to as OPNET. The interface translates extensible markup language (XML) files of, for example, network diagrams between the two software products, such as SA and OPNET. Specifically, the interface allows transfer of network diagrams from OPNET software data structure into SA software data structure to expedite the creation of enterprise architectures within SA. The interface further allows transfer of network diagrams from SA software data structure into OPNET software data structure, expediting the simulation of network diagrams within OPNET.

12 Claims, 9 Drawing Sheets

METHOD AND APPARATUS FOR PROVIDING AN INTERFACE BETWEEN SYSTEM ARCHITECT AND OPNET

TECHNICAL FIELD

The technical field relates to computer systems, and, in particular, to a method and apparatus for providing an interface between SYSTEM ARCHITECT® (SA) and OPNET.

BACKGROUND

The development of enterprise architectures (EAs) in the Federal Government is becoming increasingly important. Most government agencies are motivated to build EA because of various legislative actions and directives over the past several years. The Clinger-Cohen Act of 1996 required executive branch agencies to maintain information technology (IT) architectures. OMB Circular A-130 provided the corresponding implementation guidance. In February 2002, a study by General Accounting Office (GAO) found that "only 5 agencies reported satisfying the practices that GAO believes are needed to effectively manage enterprise architecture activities." Thus, the Federal Government is pressured to ensure each agency possesses an EA.

Given the increasing business emphasis on EA in the Federal Government, it is increasing desirable to deliver architectural products in the form of a dynamically updatable tool set. In other words, different software products used by the Federal Government should be able to dynamically exchange and update data.

An enterprise development tool developed by TELELOGIC SOFTWARE®, known as TELELOGIC®'s SYSTEM ARCHITECT® (SA), is widely used in the Federal Government, such as the United States Air Force. SA is designed to provide all of the tools necessary for development of enterprise systems. SA has the ability to perform structured analysis and design, data modeling, process modeling, network architecture design, and TELELOGIC®'s DOORS®-like requirements analysis. SA can also be easily customized to meet requirements specific to a particular agency or project or to support additional frameworks. However, SA lacks the capability in network and platform modeling and analysis.

The Air Force uses Network Modeling and Simulation software products, referred to as OPNET, for their network and platform modeling and analysis. OPNET is a product developed by OPNET TECHNOLOGIES®, Inc. for network modeling and simulation. OPNET's technology has been applied extensively to application troubleshooting, simulation and modeling, performance analysis, optimization, and planning for government and defense agencies. OPNET's product MODELER® allows users to design and study communication networks, devices, protocols, and applications with flexibility and scalability. OPNET MODELER® is becoming a standard for network and platform modeling.

Currently data cannot be readily exchanged between different software products, such as SA and OPNET, imposing significant inconvenience and cost to the users. Several commercial tool products provide pieces of an architecture to implement data communication between SA and OPNET. However, these commercial tool products do not adequately communicate well with each other. A more synergistic tool set is needed to exchange data between different software products, such as SA and OPNET.

SUMMARY

A method for providing an interface between System Architect® (SA) and OPNET includes reading a first extensible markup language (XML) file in a first data structure. The first XML file contains one or more first objects that represent first data. The first objects include nodes and links connecting the nodes. The method further includes translating the first data into second data in a second data structure and writing the translated second data into a second XML file in the second data structure. The second XML file contains one or more second objects.

A corresponding apparatus includes an interface capable of translating data between two or more data structures. The interface includes a read function capable of reading a first extensible markup language (XML) file in a first data structure. The first XML file contains one or more first objects that represent first data. The first objects include nodes and links connecting the nodes. The interface further includes a translation function capable of translating the first data into second data in a second data structure and a writing function capable of writing the translated second data into a second XML file in the second data structure. The second XML file contains one or more second objects.

DESCRIPTION OF THE DRAWINGS

The exemplary embodiments of the method and apparatus for providing an interface between System Architect® (SA) and OPNET will be described in detail with reference to the following figures, in which like numerals refer to like elements, and wherein.

DETAILED DESCRIPTION

A method and corresponding apparatus provide an interface between two software products, i.e., data structures, to produce an effective enterprise architecture (EA) tool set. The software products may be, for example, TELELOGIC®'s SYSTEM ARCHITECT® (SA) software product and Network Modeling and Simulation software product, referred to as OPNET. The interface translates extensible markup language (XML) files of, for example, network diagrams between the two software products, such as SA and OPNET. Specifically, the interface allows transfer of network diagrams from OPNET software data structure into SA software data structure to expedite the creation of enterprise architectures within SA. The interface further allows transfer of network diagrams from SA software data structure into OPNET software data structure, expediting the simulation of network diagrams within OPNET.

Figure 1:
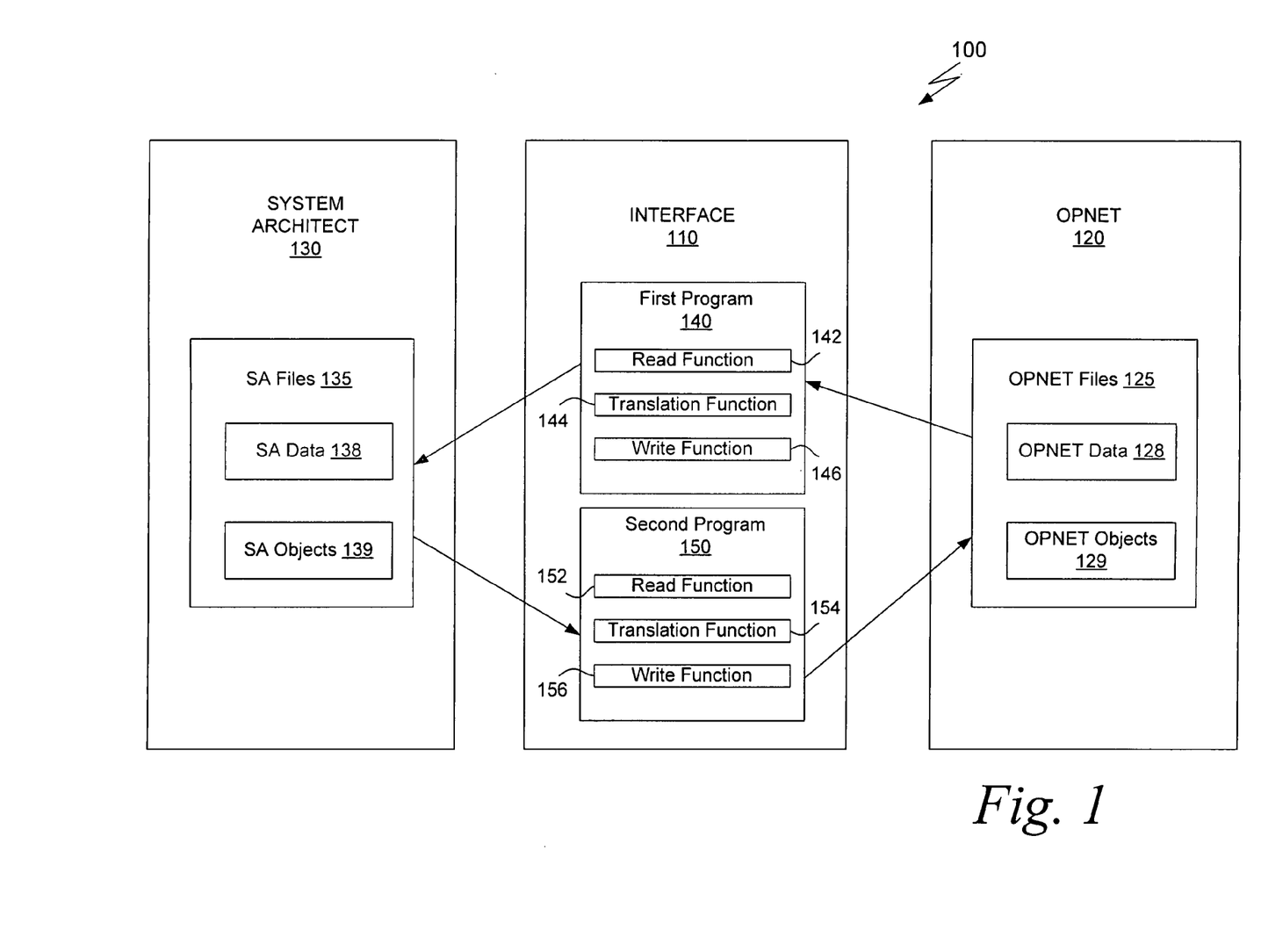
FIG. 1 illustrates an exemplary system for providing an interface between SA and OPNET.

FIG. 1 illustrates an exemplary system 100 for providing an interface 110 between SA 130 and OPNET 120. OPNET 120 has built-in capability to export XML files and to import XML files. The OPNET XML files 125 may contain OPNET tree structure diagrams. SA 130 also has the capability to export XML files and to import XML files. The SA XML files 135 may contain SA diagrams.

The method for providing the interface 110 uses a first program 140, a Java program referred to as ReadOpnetXML, to translate an XML file 125 exported from OPNET 120 into an XML file 135 that can be imported into SA 130. Specifically, the first program 140 uses a read function 142 to read an OPNET XML file 125 in order to produce an XML file 135 in the SA format, i.e., SA data structure. The first program 140 may use a translation function 144 to translate objects 129 representing OPNET data 128 into SA objects 139 representing SA data 138. OPNET objects 129 may include, for example, OPNET subnets, nodes, and links. SA objects 139 may include, for example, SA diagrams, child SA diagrams, system nodes, communications nodes, communications connections, and system entities. The first program 140 may generate an object identifier for each of the SA objects 139. The first program 140 may also identify nested OPNET subnet trees and translate the nested OPNET subnet trees into proper parent-child relationships between system nodes and SA diagrams in SA 130.

The method uses a second program 150, a Java program referred to as SysArchXML, to translate an XML file 135 exported from SA 130 into an XML file 125 that can be imported into OPNET 120. Specifically, the second program 150 uses a read function 152 to read an SA XML file 135 in order to produce an XML file 125 in the OPNET format, i.e., OPNET data structure. The second program 150 may use a translation function 154 to translate SA objects 139 representing SA data 138 into OPNET objects 129 representing OPNET data 128. As noted above, SA objects 139 may include, for example, SA diagrams, child SA diagrams, system nodes, communications nodes, communications connections, and system entities. OPNET objects 129 may include, for example, OPNET subnets, nodes, and links. The second program 150 may translate parent-child relationships between system nodes and SA diagrams into nested OPNET subnet trees in OPNET 120.

As described above, the United States Air Force uses SA 130 for their architecture framework. SA 130 has the ability to perform structured analysis and design, data modeling, process modeling, and network architecture design. However, SA 130 lacks the capability to perform network and system analysis. On the other hand, the Air Force uses OPNET 120 for their network and system analysis. Being able to dynamically exchange data between two software products, such as OPNET 120 and SA 130, is important for users of different software products, especially for the Federal Government. OPNET 120 and SA 130 are described in more detail with respect to FIGS. 2 and 3, respectively.

Figure 2:
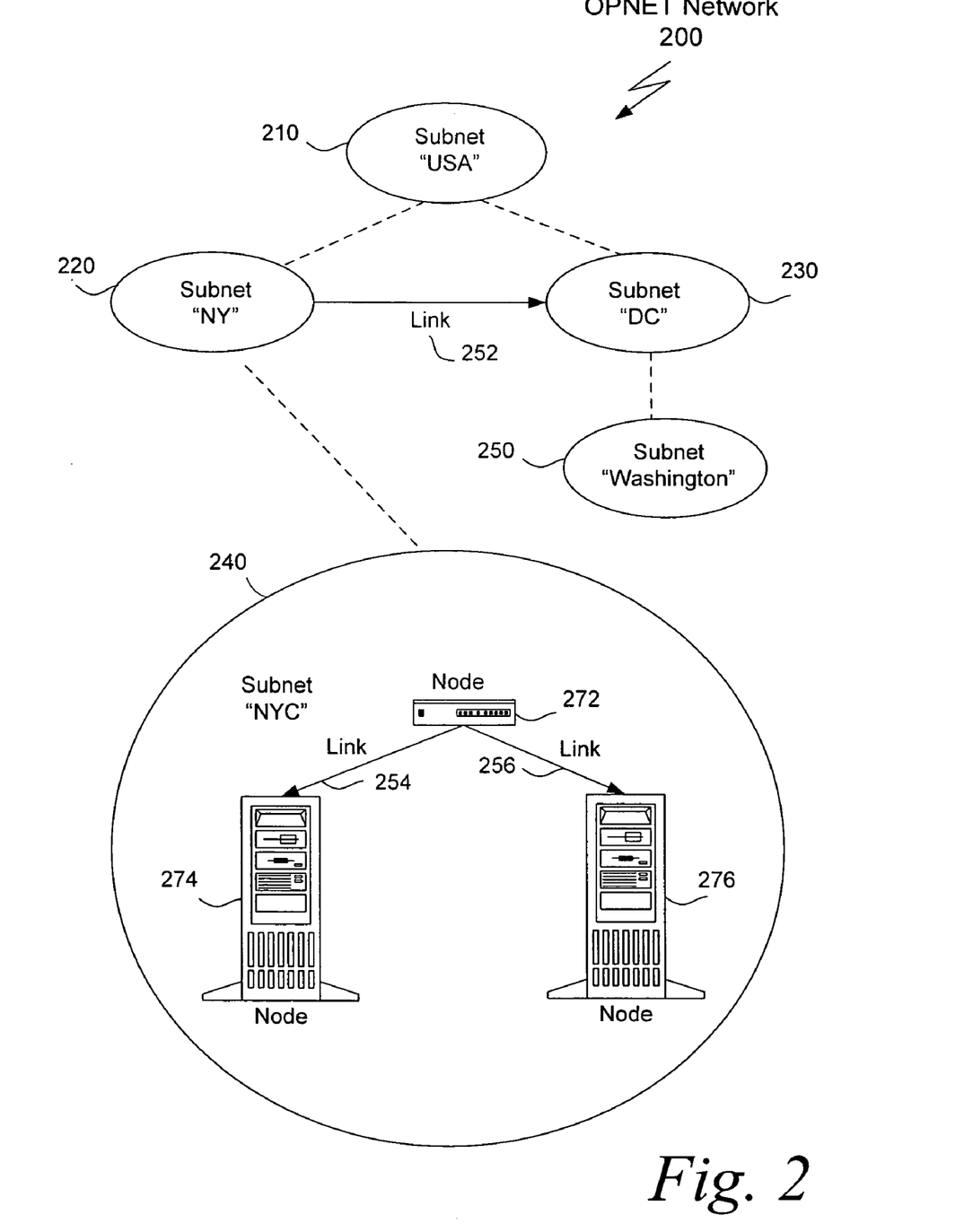
FIG. 2 illustrates an exemplary OPNET network containing various OPNET objects.

FIG. 2 illustrates an exemplary OPNET network 200 containing various OPNET objects 129, such as subnets 210, 220, 230, 240, 250, nodes 272, 274, 276, and links 252, 254, 256. OPNET 120 is product for network modeling and simulation. A specific product, referred to as OPNET Modeler®, manages complex network topologies with unlimited subnetwork nesting. OPNET Modeler® performs object-oriented modeling so that nodes and protocols are modeled as classes with inheritance and specialization.

OPNET Modeler® is based on a series of hierarchical project editors that directly parallel the structure of real networks, equipment, and protocols. A project editor graphically represents the topology of a communications network 200. Networks 200 may include node objects 272, 274, 276 and link objects 252, 254, 256, which are configurable using dialog boxes. A node editor captures the architecture of a network device or system by depicting the flow of data between functional elements, referred to as modules. A process editor uses a powerful finite state machine (FSM) approach to support specification, at any level of detail, of protocols, resources, applications, algorithms, and queuing policies.

Referring to FIG. 2, the OPNET network 200 has a tree subnet structure. For example, subnet "USA" 210 has two subnets: subnet "NY" 220 and subnet "DC" 230. Subnet "NY" 220 is connected to subnet "DC" 230 using a network link 252, such as a wide-area network (WAN). Subnet "NY" 220 further includes another subnet: subnet "NYC" 240. Subnet "DC" 230 includes another subnet: subnet "Washington" 250. A subnet may include nodes that are connected by links. For example, in subnet "NYC" 240, two server nodes 274, 276 are connected to a firewall node 272 using network links 254, 256, respectively. The network links 254, 256 may be a local-area network (LAN).

Figure 3:
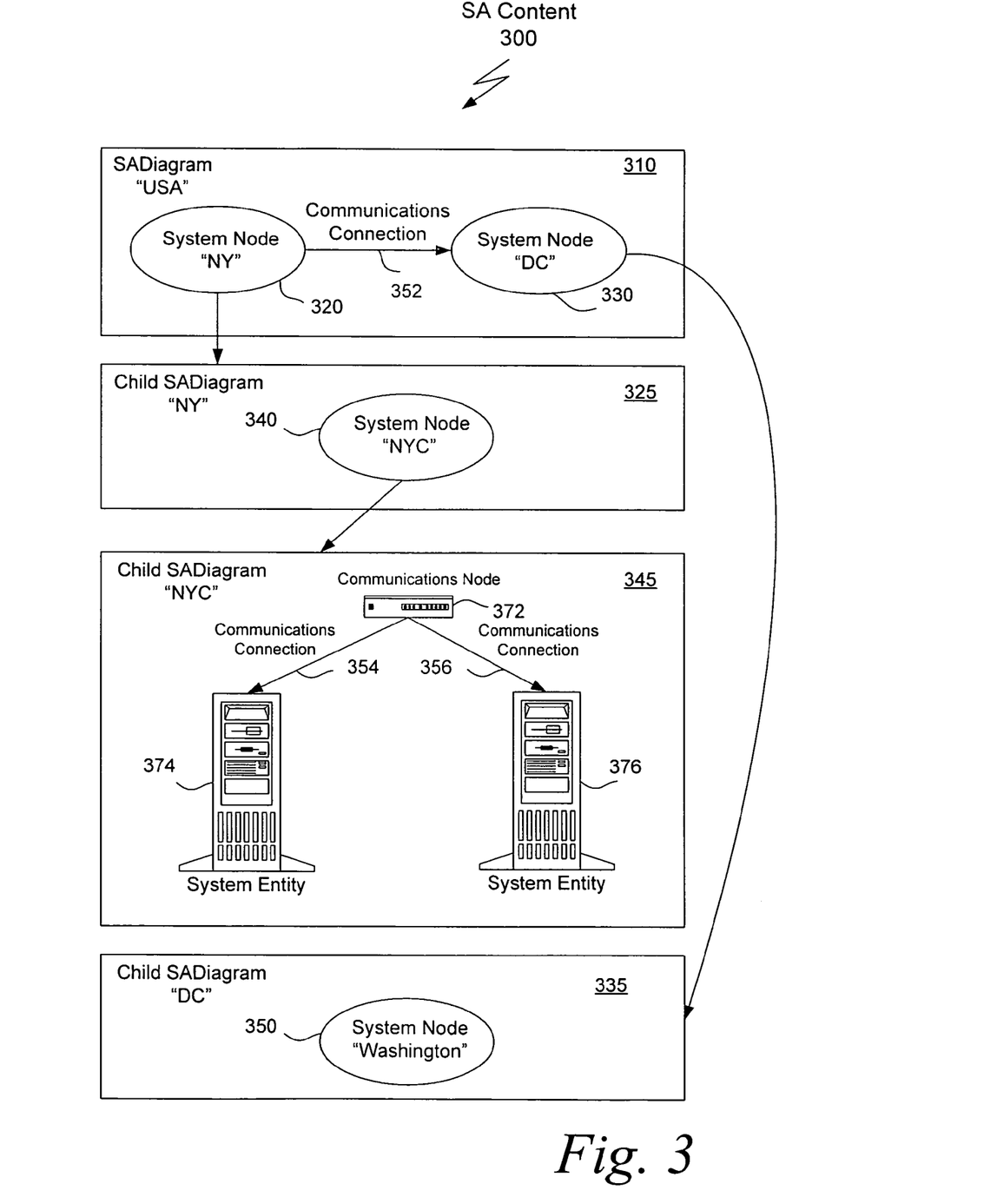
FIG. 3 illustrates an exemplary SA content containing various SA objects.

FIG. 3 illustrates an exemplary SA content 300, e.g., an array of SA diagrams. The SA content 300 contains various SA objects 139, such as SA diagrams 310, child SA diagrams 325, 335, 345, system nodes 320, 330, 340, 350, communications nodes 372, communications connections 352, 354, 356, and system entities 374, 376. SA 130 provides a set of business modeling diagrams, such as SA content 300, to capture the enterprise from various business perspectives. SA 130 also provides extensive support for unified modeling language (UML), the industry standard for analysis and design of software systems and applications. SA 130 includes XML design functionality to model XML designs in an XML hierarchy diagram.

Referring to FIG. 3, the SA content 300 includes an array of SA diagrams 310 and child SA diagrams 325, 335, 345. Each SA diagram or child SA diagrams may include one or more system nodes, communications nodes, or system entities. For example, SA diagram "USA" 310 has two system nodes: system node "NY" 320 and system node "DC" 330. System node "NY" 320 is connected to system node "DC" 330 using a network communications connection 352, such as a WAN. System node "NY" 320 has a child SA diagram: child SA diagram "NY" 325. Child SA diagram "NY" 325 includes another system node: system node "NYC" 340. System node "NYC" 340 has another child SA diagram: child SA diagram "NYC" 345. Similarly, system node "DC" 330 has a child SA diagram: child diagram "DC" 335. Child SA diagram "DC" 335 includes a system node: system node "Washington" 350. In child SA diagram "NYC" 345, two system entities 374, 376 are connected to a firewall communications node 372 using network communications connections 354, 356, respectively. The network communications connections 354, 356 may be a LAN.

The SA objects 139 in the SA content 300 of FIG. 3 may be translated from the OPNET objects 129 in the OPNET network 200 of FIG. 2. Similarly, the OPNET objects 129 in the OPNET network 200 may be translated from the SA objects 139 in the SA content 300. The translation process will be described in more detail with respect to FIGS. 4-6. The method and corresponding apparatus for providing an interface 110 between SA 130 and OPNET 120 is described with respect to SA 130 and OPNET 120 for illustration purposes. One skilled in the art will appreciate that the method and apparatus can be equally applicable to other software products.

Figure 4:
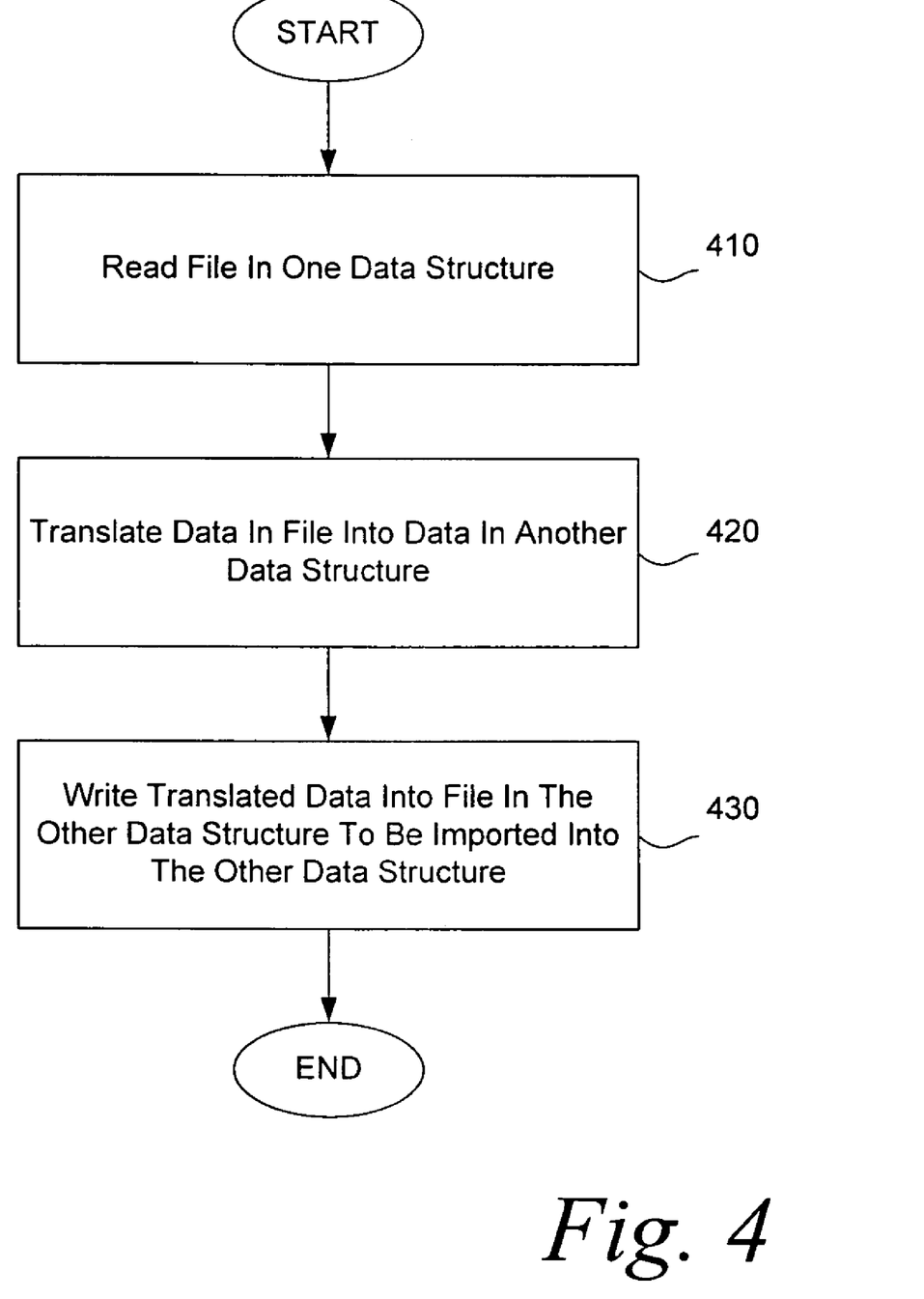
FIG. 4 is a flow chart illustrating an exemplary method for providing an interface between two software data structures.

FIG. 4 is a flow chart illustrating an exemplary method for providing an interface between two software data structures, such as SA 130 and OPNET 120. The method first reads a file, such as an XML file, in one software data structure (block 410). The data structure may be in SA 130 or OPNET 120, for example. Next, the method translates data in the XML file from the original data structure into a desired data structure (block 420). Finally, the method writes the translated data into a file, such as an XML file, in the desired data structure to be imported into the desired data structure (block 430).

Figure 5A:
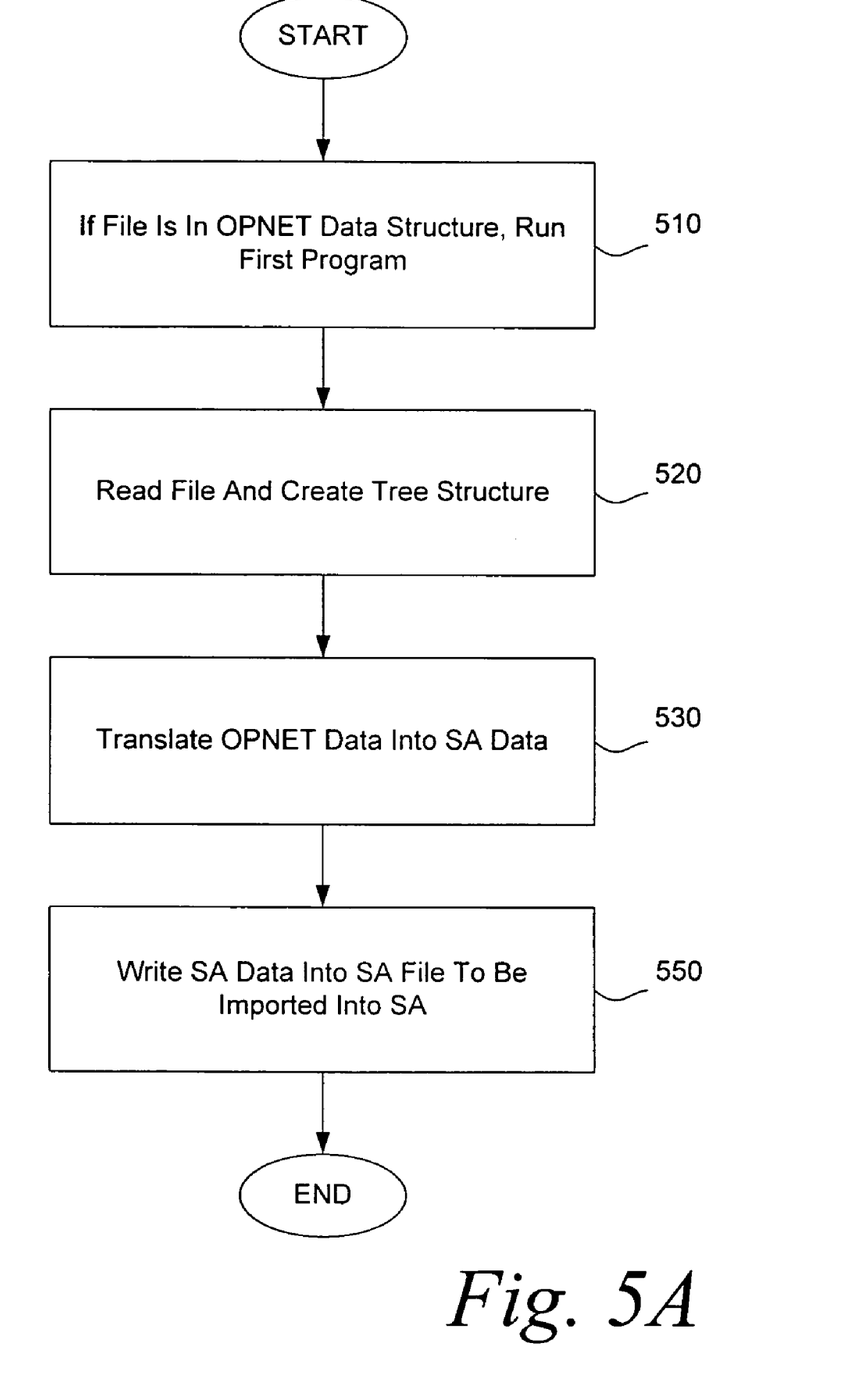
FIGS. 5A and 5B are flow charts illustrating an exemplary method for translating an XML file from OPNET into SA.
Figure 5B:
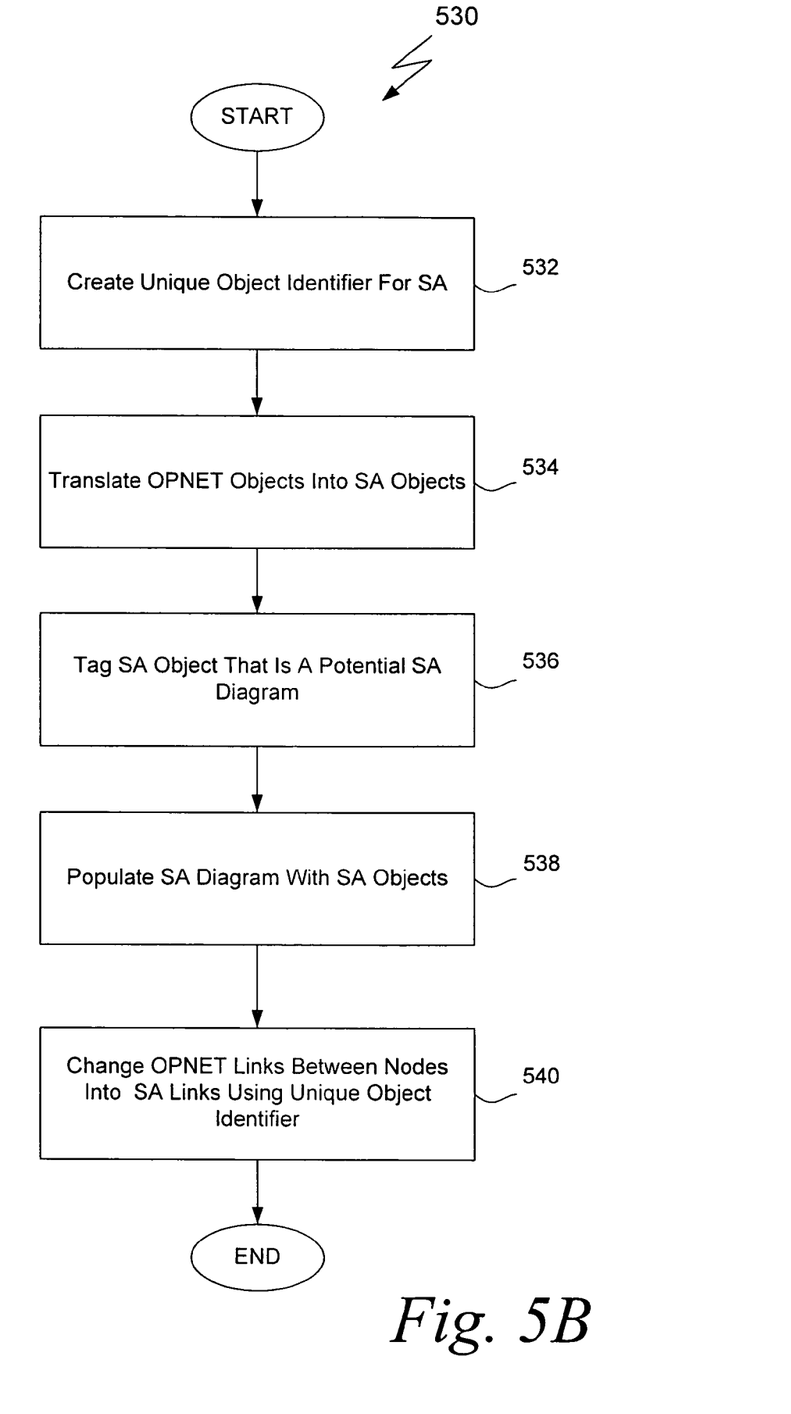

FIGS. 5A and 5B are flow charts illustrating an exemplary method for translating an XML file from OPNET 120 into SA 130. Referring to FIG. 5A, if an XML file 125 is in OPNET data structure, the method may run a first program 140, such as ReadOpnetXML (block 510). The first program 140 uses the read function 142 to read the XML file 125 and to create a tree subnet structure that contains OPNET objects 129 (block 520). The OPNET objects 129 represent OPNET data 128. Next, the first program 140 uses the translation function 144 to translate OPNET data 128 in the XML file 125 into SA data 138 (block 530). Finally, the first program 140 uses the write function 146, referred to as writeFile( ), to write the SA data 138 into a SA XML file 135 to be imported into SA 130 (block 550). The SA XML file 135 may contain SA diagrams and definitions for SA objects 139.

FIG. 5B illustrates the translation step 530 of FIG. 5A. To translate the OPNET data 128 into SA data 138, every object in the OPNET tree subnet structure may be examined one at a time. A unique object identifier, such as SA ObjIds, may be provided for each object in SA 130 (block 532). OPNET objects 129 may be translated into SA objects 139 according to a set of rules (block 534). The set of rules may be based on, for example, knowledge of the two software products with respect to each other and how each software product represents networks.

During the object translation process, any OPNET subnet object 129 that is identified as having children, such as subnet "USA" 210 in FIG. 2, may be provided an extra tag to mark the object as being a potential SA diagram, such as SA diagram "USA" 310 in FIG. 3 (block 536). The objects that are tagged as potential SA diagrams may be put into an array of diagrams. The array of diagrams are then populated by SA objects 139 that are translated from the OPNET objects 129 (block 538).

The SA objects 139 that can be created from an OPNET node may include system entities and communications nodes. For example, referring to FIGS. 2 and 3, server nodes 274, 276 in FIG. 2 may be translated into system entities 374, 376, respectively, in FIG. 3. Firewall node 272 in FIG. 2 may be translated into firewall communications node 372 in FIG. 3.

SA diagrams and system nodes may be created from OPNET subnets. Referring again to FIGS. 2 and 3, subnet "USA" 210 in FIG. 2 may be translated into SA diagram "USA" 310 in FIG. 3. Subnet "NY" 220, subnet "DC" 230, subnet "NYC" 240, and subnet "Washington" 250 in FIG. 2 may be translated into system node "NY" 320, system node "DC" 330, system node "NYC" 340, and system node "Washington" 350, respectively, in FIG. 3. When an OPNET subnet has children, such as subnet "NY" 220 in FIG. 2, the subnet may be represented as an SA diagram or a child SA diagram, such as child SA diagram "NY" 325 in FIG. 3. When an OPNET subnet appears inside another subnet, such as subnet "NYC" 240 appearing inside subnet "NY" 220 in FIG. 2, the subnet may be represented as an SA system node inside that SA diagram or child SA diagram, such as system node "NYC" 340 appearing inside child system diagram "NY" 325. As a result, the OPNET tree structure is changed into an array of SA diagrams that have parent-child relationships with certain SA system nodes in SA diagrams or child SA diagrams, as illustrated in FIG. 3.

SA links, referred to as communications connections, may be created from OPNET links using the unique object identifier for the SA data objects connected by the SA links (block 540). For example, referring again to FIGS. 2 and 3, links 252, 254, 256 in FIG. 2 may be translated into communications connections 352, 354, 356, respectively, in FIG. 3. A function, referred to as makeSysArch( ), may be used to perform the actual translation from OPNET data 138 to SA data 128.

Figure 6A:
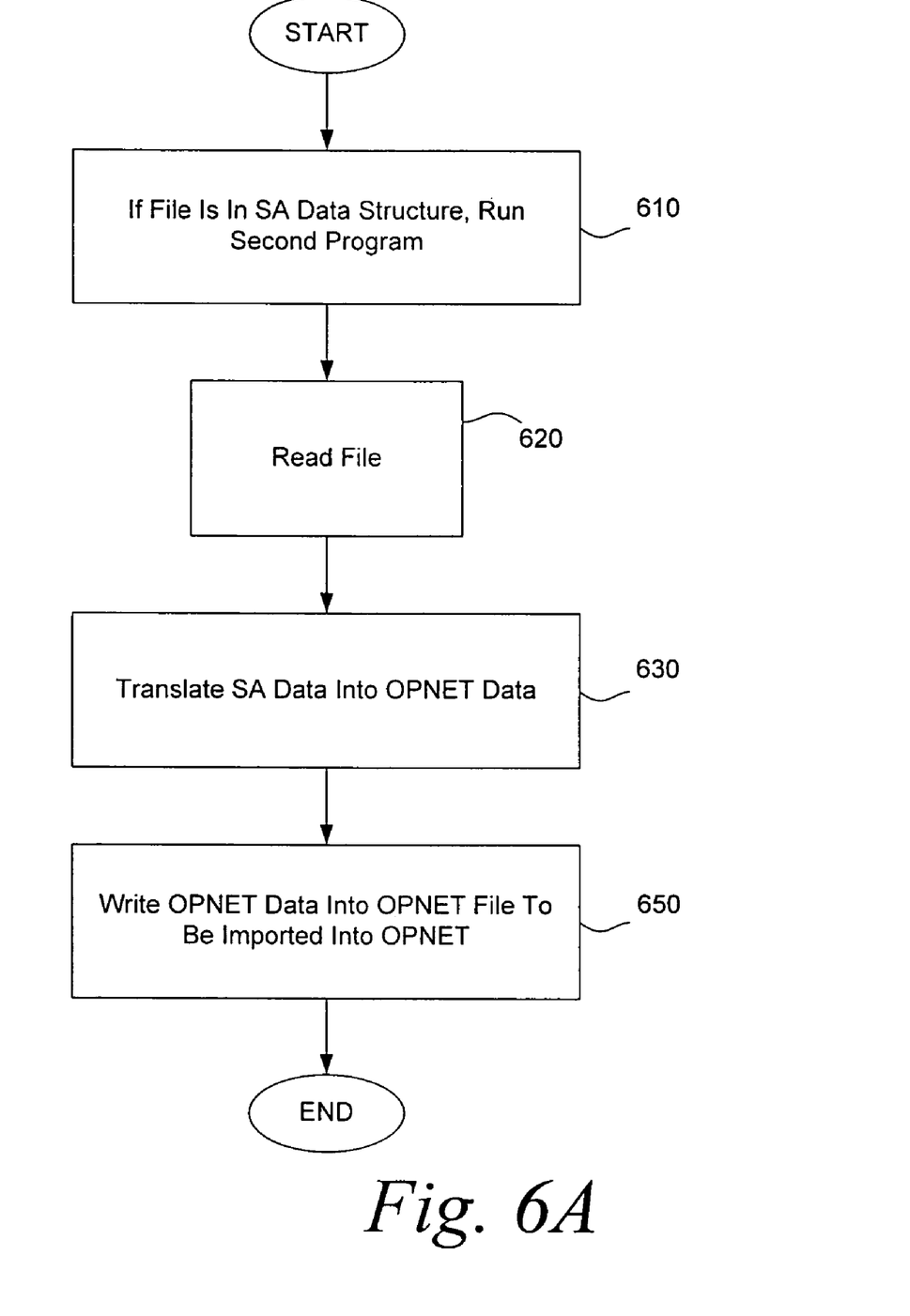
FIGS. 6A and 6B are flow charts illustrating an exemplary method for translating an XML file from SA to OPNET.
Figure 6B:
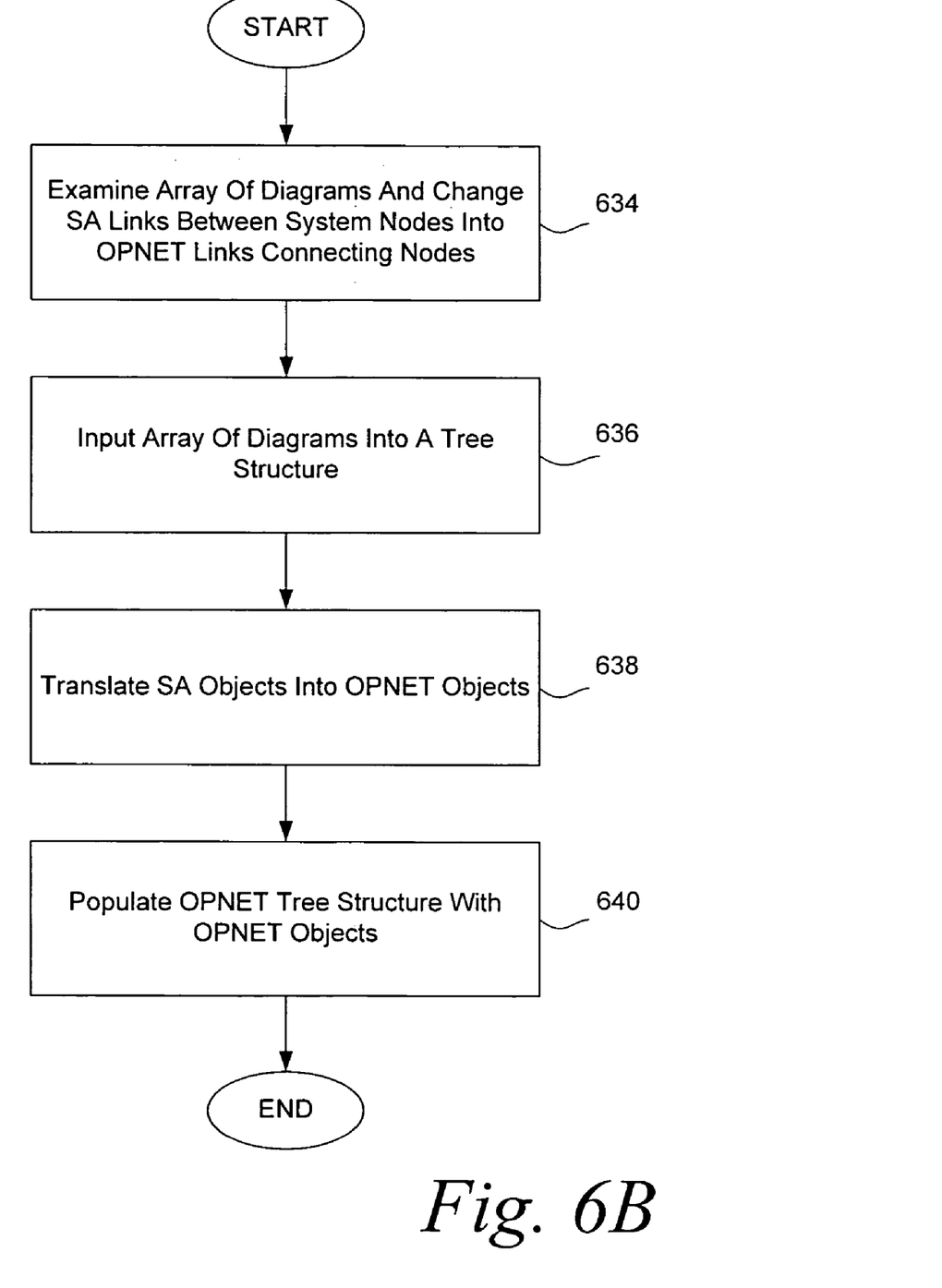

FIGS. 6A and 6B are flow charts illustrating an exemplary method for translating an XML file from SA 130 to OPNET 120. Referring to FIG. 6A, if an XML file 135 is in SA data structure, the method may run the second program 150, such as SysArchXML (block 610). The second program 150 uses the read function 152, referred to as readFile( ), and a parser to input SA XML data 138 into an array of diagrams containing SA objects 139 (block 620). The SA objects 139 represent SA data 138. Next, the second program 150 uses the translation function 154 to translate SA data 138 in the XML file 135 into OPNET data 128 (block 630). Finally, the second program 150 uses the write function 156, referred to as writeFile( ), to write the OPNET data 128 into an OPNET XML file 125 to be imported into OPNET 120 (block 650), using the nested format of OPNET XML files 135 to represent the tree structure. The OPNET XML file 125 may contain subnets, nodes, links, and other OPNET objects 129.

FIG. 6B illustrates the translation step 630 of FIG. 6A. OPNET typically uses names instead of object identifiers. The method examines the array of diagrams 300 in SA 130 and changes SA's unique object identifiers that identify SA network links between system nodes into names of OPNET links (block 634). For example, communications connections 352, 354, 356 in SA 130 in FIG. 3, may be translated into links 252, 254, 256, respectively, in FIG. 2 for OPNET 120.

Next, the array of diagrams in SA 130 may be input into a tree subnet structure that contains OPNET objects 129 (block 636). SA objects 139 may be translated into OPNET objects 129 according to a set of rules (block 638). Similar to the translation from OPNET to SA, the set of rules may be based on, for example, knowledge of the two software products with respect to each other and how each software product represents networks. Next, the OPNET tree subnet structure may be populated by the OPNET objects 129 that are translated from the SA data objects 139 (block 640).

OPNET nodes 272, 274, 276 may be created from SA communications nodes and system entities. For example, referring to FIGS. 2 and 3, firewall communications node 372 in FIG. 3 may be translated into firewall node 272 in FIG. 2. System entities 374, 376 in FIG. 3 may be translated into server nodes 274, 276, respectively, in FIG. 2.

OPNET subnets may be created from SA system nodes, SA diagrams, and child SA diagrams. For example, referring again to FIGS. 2 and 3, SA diagram "USA" 310 in FIG. 3 may be translated into subnet "USA" 210 in FIG. 2. Tags that represent parent-child relationships in SA 130 may be identified and used to create tree subnet structure in OPNET 120. Specifically, the tags may show which subnets have children. For example, referring again to FIGS. 2 and 3, system node "NY" 320 has a child SA diagram: child SA diagram "NY" 325. System node "NY" 320 may be represented in OPNET 120 as subnet "NY" 220 that has a child subnet: subnet "NYC" 240. Similarly, system node "DC" 330 has a child SA diagram: child SA diagram "DC" 335. System node "DC" 330 may be represented in OPNET 120 as subnet "DC" 230 that has a child subnet: subnet "Washington" 250. Likewise, system node "NYC" 340 has a child SA diagram: child SA diagram "NYC" 345. System node "NYC" 340 may be represented in OPNET 120 as subnet "NYC" 240. As a result, a tree subnet structure may be built in OPNET 120 that represents the parent-child relationships in SA 130.

OPNET may have less object types than SA. OPNET may use, for example, model types to preserve the SA object types. For example, firewall communications node 372 in SA 130 may be translated into: node name="firewall" and model="communications node" in OPNET 120. A function, referred to as makeOpnet( ), may be used to perform the translation from SA data 138 to OPNET data 128.

Figure 7:
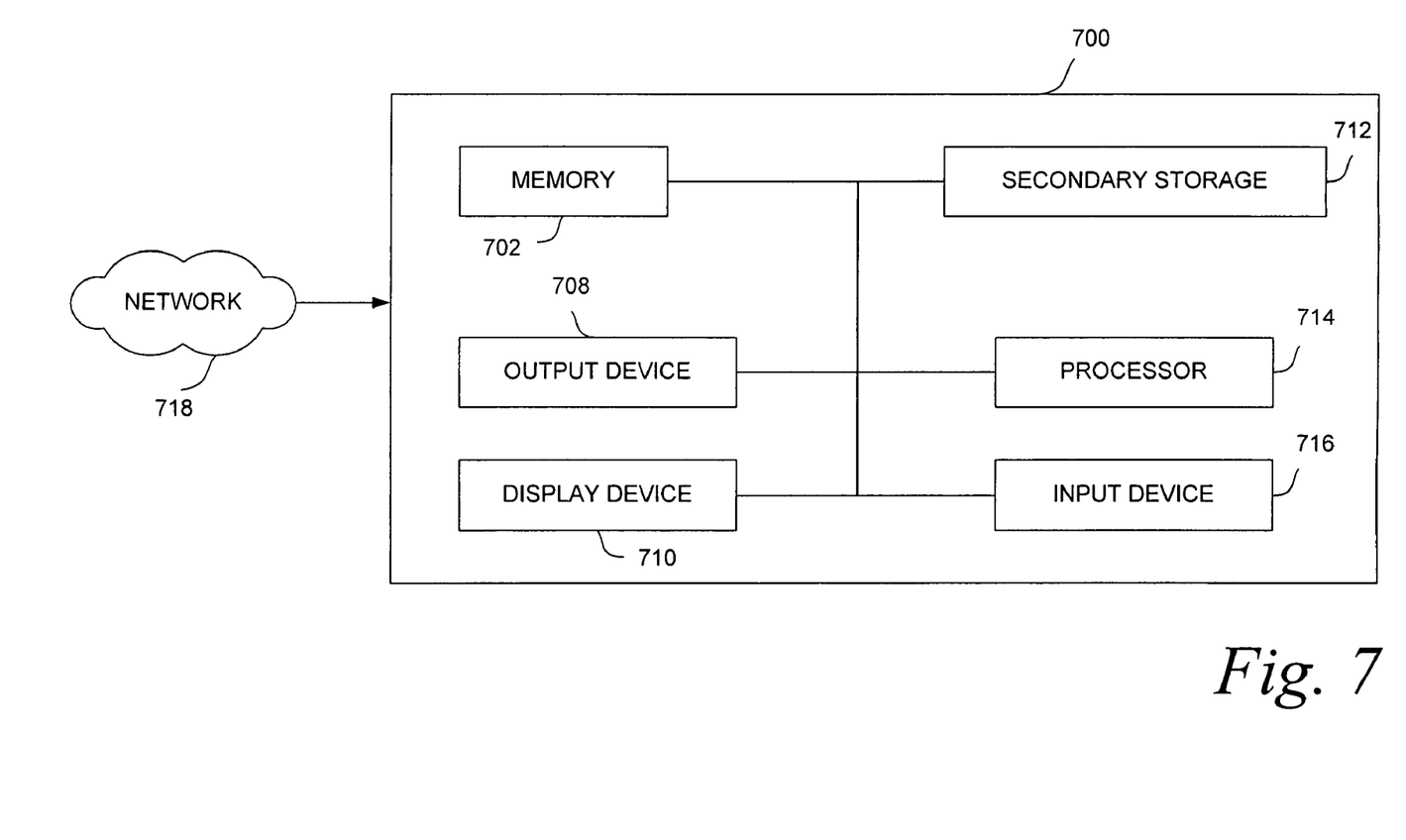
FIG. 7 illustrates exemplary hardware components of a computer that may be used in connection with the exemplary method for providing an interface between SA and OPNET.

FIG. 7 illustrates exemplary hardware components of a computer 700 that may be used in connection with the method for providing an interface between SA and OPNET. The computer 700 includes a connection 720 with a network 718 such as the Internet or other type of computer or telephone network. The computer 700 typically includes a memory 702, a secondary storage device 712, a processor 714, an input device 716, a display device 710, and an output device 708.

The memory 702 may include random access memory (RAM) or similar types of memory. The secondary storage device 712 may include a hard disk drive, floppy disk drive, CD-ROM drive, or other types of non-volatile data storage, and may correspond with various databases or other resources. The processor 714 may execute instructions stored in the memory 702, the secondary storage 712, or received from the Internet or other network 718. The instructions may include instructions for performing the methods described herein. These instructions may include programs (e.g., first program or second program) that includes modules and sub-modules corresponding to the methods and the steps described herein (e.g., read, write, and translation function modules). The input device 716 may include any device for entering data into the computer 700, such as a keyboard, keypad, cursor-control device, touch-screen (possibly with a stylus), or microphone. The display device 710 may include any type of device for presenting visual image, such as, for example, a computer monitor, flat-screen display, or display panel. The output device 708 may include any type of device for presenting data in hard copy format, such as a printer, and other types of output devices including speakers or any device for providing data in audio form. The computer 700 can possibly include multiple input devices, output devices, and display devices.

Although the computer 700 is depicted with various components, one skilled in the art will appreciate that the computer 700 can contain additional or different components. In addition, although aspects of an implementation consistent with the method for providing an interface between SA and OPNET are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 700 to perform a particular method.

While the system and method for providing an interface between SA and OPNET have been described in connection with an exemplary embodiment, those skilled in the art will understand that many modifications in light of these teachings are possible, and this application is intended to cover variations thereof.

What is claimed is:

1. A method for providing an interface between SYSTEM ARCHITECT® (SA) and OPNET, the method comprising:
   determining if a file is a first extensible markup language (XML) file in a first data structure or is a second XML file in a second data structure, wherein the first data structure has a tree subnet structure and the second data structure has an array of diagrams having parent-child relationships, wherein the first XML file is in an OPNET data structure and the second XML file is in an SA data structure, and wherein the first objects are OPNET objects and the second objects are SA objects;
   if the file is the first XML file in the first data structure, reading the first XML file in the first data structure, the first XML file containing one or more first objects that represent first data, the one or more first objects including subnets, nodes, and links connecting the nodes;
   translating the first data into second data in the second data structure, the translating step comprising:
      creating a unique object identifier for each object in the SA data structure;
      translating the OPNET objects into the SA objects;
      tagging SA objects that are potential SA diagrams; and
      populating SA diagrams with the SA objects;
   writing the translated second data into the second XML file in the second data structure, the second XML file containing one or more second objects, the one or more second objects including diagrams, child diagrams, system nodes, communication nodes, communication connections, and system entities,
   if the file is the second XML file in the second data structure, reading the second XML file in the second data structure;
   translating the second data into the first data in the first data structure; and
   writing the translated first data into the first XML file in the first data structure,
   wherein translating the file from the first data structure to the second data structure is different from translating the file from the second data structure to the first data structure.

2. The method of claim 1, wherein the reading step further comprises creating a tree subnet structure in OPNET.

3. The method of claim 1, wherein the translating step further comprises changing OPNET links between the nodes into SA links using the unique object identifier.

4. A method for providing an interface between SYSTEM ARCHITECT® (SA) and OPNET, the method comprising:
   determinine if a file is a first extensible markup language (XML) file in a first data structure or is a second XML file in a second data structure, wherein the first data structure has a tree subnet structure and the second data structure has an array of diagrams having parent-child relationships, wherein the first XML file is in an OPNET data structure and the second XML file is in an SA data structure, and wherein the first objects are OPNET objects and the second objects are SA objects;
   if the file is the first XML file in the first data structure, reading the first XML file in the first data structure, the first XML file containing one or more first objects that represent first data, the one or more first objects including subnets, nodes, and links connecting the nodes;

translating the first data into second data in the second data structure;

writing the translated second data into the second XML file in the second data structure, the second XML file containing one or more second objects, the one or more second objects including diagrams, child diagrams, system nodes, communication nodes, communication connections, and system entities, if the file is the second XML file in the second data structure, reading the second XML file in the second data structure;

translating the second data into the first data in the first data structure, the translating step comprising:
examining the array of diagrams in the SA data structure;
changing SA links between nodes into OPNET links;
inputting the array of diagrams into the two structure;
translating the SA objects into the OPNET objects; and
populating the tree structure with the OPNET objects; and writing the translated first data into the first XML file in the first data structure, wherein translating the file from the first data structure to the second data structure is different from translating the file from the second data structure to the first data structure.

5. The method of claim 4, wherein the translating step further comprises using model types to preserve SA object types in OPNET.

6. An apparatus for providing an interface between SYSTEM ARCHITECT® (SA) and OPNET, comprising:
a processor;
a memory; and
an interface that translates data between two or more data structures, the interface comprising:
a module for determining if a file is a first extensible markup language (XML) file in a first data structure or is a second XML file in a second data structure, wherein the first data structure has a tree subnet structure and the second data structure has an array of diagrams having parent-child relationships, wherein the first XML file is in an OPNET data structure and the second XML file is in an SA data structure, and wherein the first objects are OPNET objects and the second objects are SA objects;
a read module that, if the file is the first XML file in the first data structure, reads the first XML file in the first data structure, the first XML file containing one or more first objects that represent first data, the one or more first objects including subnets, nodes, and links connecting the nodes;
a translation module that translates the first data into second data in the second data structure, wherein the translation module creates a unique object identifier for each object in the SA data structure, translates the OPNET objects into the SA objects, tags SA objects that are potential SA diagrams, and populates SA diagrams with the SA objects; and
a write module that writes the translated second data into the second XML file in the second data structure, the second XML file containing one or more second objects, the one or more second objects including diagrams, child diagrams, system nodes, communication nodes, communication connections, and system entities, wherein translating the file from the first data structure to the second data structure is different from translating the file from the second data structure to the first data structure.

7. The apparatus of claim 6, wherein the read module creates a tree subnet structure in OPNET.

8. The apparatus of claim 6, wherein the translation module changes OPNET links between the nodes into SA links using the unique object identifier.

9. An apparatus for providing an interface between SYSTEM ARCHITECT® (SA) and OPNET, comprising:
a processor;
a memory; and
an interface that translates data between two or more data structures, the interface comprising:
a module for determining if a file is a first extensible markup language (XML) file in a first data structure or is a second XML file in a second data structure, wherein the first data structure has an array of diagrams having parent-child relationships and the second data structure has a tree subnet structure, wherein the first XML file is in an SA data structure and the second XML file is in an OPNET data structure, and wherein the first objects are SA objects and the second objects are OPNET objects;
a read module that, if the file is the first XML file in the first data structure, reads the first XML file in the first data structure, the first XML file containing one or more first objects that represent first data, the one or more first objects including diagrams, child diagrams, system nodes, communication nodes, communication connections, and system entities,
a translation module that translates the first data into second data in the second data structure, wherein the translation module examines an array of diagrams in the SA data structure, changes SA links between nodes into OPNET links, inputs the array of diagrams into a tree structure, translates the SA objects into the OPNET objects, and populates the tree structure with the OPNET objects; and
a write module that writes the translated second data into a the second XML file in the second data structure, the second XML file containing one or more second objects, the one or more second objects including subnets, nodes, and links connecting the nodes,
wherein translating the file from the first data structure to the second data structure is different from translating the file from the second data structure to the first data structure.

10. The apparatus of claim 9, wherein the translation module uses model types to preserve SA object types in OPNET.

11. A computer readable medium providing instructions for providing an interface between SYSTEM ARCHITECT® (SA) and OPNET, the instructions comprising:
determining if a file is a first extensible markup language (XML) file in a first data structure or is a second XML file in a second data structure, wherein the first data structure has a tree subnet structure and the second data structure has an array of diagrams having parent-child relationships, wherein the first XML file is in an OPNET data structure and the second XML file is in an SA data structure, and wherein the first objects are OPNET objects and the second objects are SA objects;
if the files the first XML file in the first data structure, reading the first XML file in the first data structure, the first XML file containing one or more first objects that represent first data, the one or more first objects including subnets, nodes, and links connecting the nodes;

translating the first data into second data in the second data structure, the instruction for translating comprising:

creating a unique object identifier for each object in the SA data structure;

translating the OPNET objects into the SA objects;

tagging SA objects that are potential SA diagrams; and populating SA diagrams with the SA objects;

writing the translated second data into the second XML file in the second data structure, the second XML file containing one or more second objects, the one or more second objects including diagrams, child diagrams, system nodes, communication nodes, communication connections, and system entities, if the file is the second XML file in the second data structure, reading the second XML file in the second data structure;

translating the second data into the first data in the first data structure; and writing the translated first data into the first XML file in the first data structure, wherein translating the file from the first data structure to the second data structure is different from translating the file from the second data structure to the first data structure.

12. A computer readable medium providing instructions for providing an interface between SYSTEM ARCHITECT® (SA) and OPNET, the instructions comprising:

determining if a file is a first extensible markup language (XML) file in a first data structure or is a second XML file in a second data structure, wherein the first data structure has an array of diagrams having parent-child relationships and the second data structure has a tree subnet structure, wherein the first XML file is in an SA data structure and the second XML file is in an OPNET data structure, and wherein the first objects are SA objects and the second objects are OPNET objects;

if the file is the first XML file in the first data structure, reading the first XML file in the first data structure, the first XML file containing one or more first objects that represent first data, the one or more first objects including diagrams, child diagrams, system nodes, communication nodes, communication connections, and system entities;

translating the first data into second data in the second data structure, the instructions for translating comprising:

examining an array of diagrams in the SA data structure;

changing SA links between nodes into OPNET links;

inputting the array of diagrams into a tree structure;

translating the SA objects into the OPNET objects; and populating the tree structure with tile OPNET objects;

writing the translated second data into a the second XML file in the second data structure, the second XML file containing one or more second objects, the one or more second objects including subnets, nodes, and links connecting the nodes;

if the file is the second XML file in the second data structure, reading the second XML file in the second data structure;

translating the second data into the first data in the first data structure; and writing the translated first data into the first XML file in the first data structure, wherein translating the file from the first data structure to the second data structure is different from translating the file from the second data structure to the first data structure.

* * * * *